Jan. 3, 1933.　　　　W. HETER　　　　1,893,367

DIRECT CURRENT DYNAMO ELECTRIC MACHINE

Filed Jan. 30, 1932

Inventor:
Wylie Heter,
by Charles E. Mullen
His Attorney.

Patented Jan. 3, 1933

1,893,367

UNITED STATES PATENT OFFICE

WYLIE HETER, OF SCOTIA, NEW YORK, ASSIGNOR TO GENERAL ELECTRIC COMPANY, A CORPORATION OF NEW YORK

DIRECT CURRENT DYNAMO-ELECTRIC MACHINE

Application filed January 30, 1932. Serial No. 589,957.

My invention relates to direct current dynamo-electric machines.

In the operation of direct current generators, it is sometimes desirable to utilize the generator as a single phase alternating current motor. This is particularly true in case of direct current generators which are driven by alternating current synchronous motors, and where direct current is not available for utilizing the generator as a starting motor, so that the alternating current motor can be brought up to synchronous speed and connected to a source of alternating current for driving the direct current generator. It has been proposed, heretofore, to provide an alternating current starting motor for bringing the motor and generator set up to synchronous speed, but this involves the cost of an additional machine. Furthermore, in some installations, where space is of primary importance, such as in electrically driven locomotives, for example, the use of a starting motor is quite undesirable. For these reasons, it is desirable to eliminate the use of a starting motor for bringing the synchronous motor and direct current generator up to the synchronous speed of the motor.

It has not been possible to operate the ordinary type of direct current generator as a single phase alternating current motor in a system of this type for bringing the synchronous motor up to speed, however, because the eddy currents in the solid field frame of the machine prevent the building up of sufficient alternating current magnetic flux to give the necessary starting torque. For this reason, the difficulties encountered in obtaining the required starting torque have made it impracticable to operate direct current generators as single phase alternating current motors.

The object of my invention is to provide a direct current dynamo-electric machine which is capable of building up sufficient alternating current magnetic flux to give the necessary starting torque, so that the machine can be operated as a single phase alternating current motor. I accomplish this by providing a direct current dynamo-electric machine having a stationary member including a magnet frame, and laminated structure extending about the periphery of the magnet frame which will carry sufficient alternating current magnetic flux to start the machine as a single phase alternating current motor.

Figure 1:
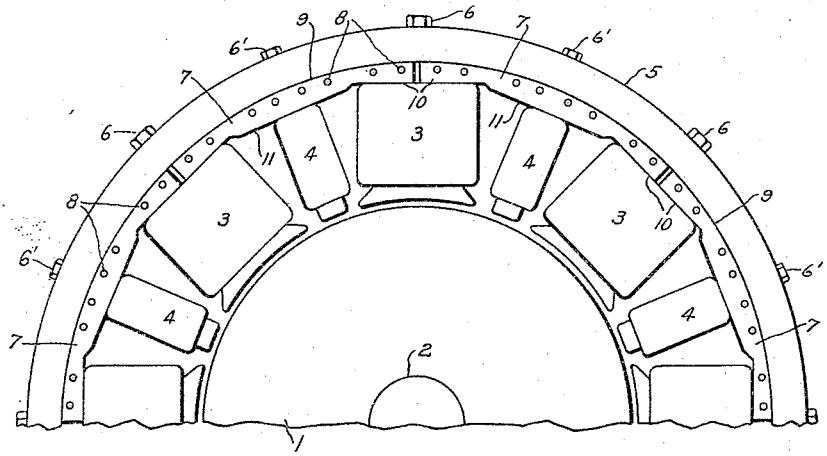
Figure 2:
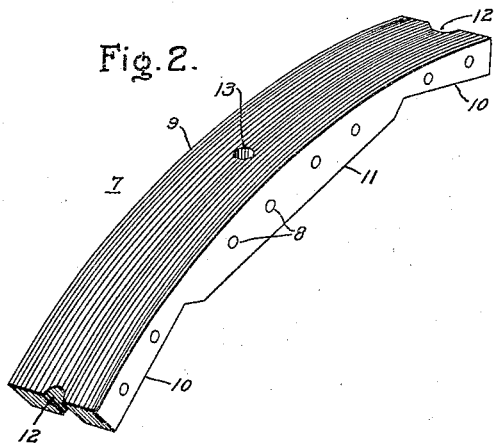

In the drawing, Fig. 1 is a fragmentary end view of a direct current dynamo-electric machine embodying my invention, and Fig. 2 is a perspective view of part of the laminated structure shown in Fig. 1.

Referring to Fig. 1, I have shown my invention embodied in a direct current dynamo-electric machine having a rotatable member 1 mounted on a shaft 2, and a stationary member including main field poles 3 and commutating poles 4 extending radially inward from a magnet frame 5, and secured thereto by bolts 6 and 6' respectively.

In accordance with my invention, the machine is constructed so that the field structure will carry sufficient alternating current magnetic flux to give the necessary starting torque when it is operated as a single phase alternating current motor. I do this by providing a laminated structure extending about the entire inner periphery of the magnet frame 5, and extending between the magnet frame and the main poles 3 and commutating poles 4. This laminated structure comprises a number of arcuate shaped bodies 7 riveted at 8 and having a curved outer surface 9, as shown in Fig. 2, which is adapted to fit closely against the inner periphery of the magnet frame 5, and a three sided inner surface having two outer symmetrical sides 10 and an intermediate side 11, these sides being made large enough to provide a flat shoulder for the windings on the poles of the machine. The laminated bodies 7 are arranged end to end about the inner periphery of the magnet frame 5, with each laminated body extending between the centers of two adjacent main field poles 3, which are secured to the sides 10 of two adjacent bodies by the bolts 6 extending through notches 12 therein, and the commutating poles 4 are secured against the sides 11 by the bolts 6' extending through openings 13.

By employing the laminated bodies 7 having flat inner surfaces, a magnet frame of minimum outside diameter can be used because the rivets 8 can be placed in the thickest sections of the bodies, so that they will not reduce the cross sectional area of the flux path through the bodies. Furthermore, the particular shape of the laminations insures high mechanical strength of the bodies 7, so that they can be handled and assembled between the poles and the magnet frame without any difficulty. In this way, the size of the machine is not appreciably increased, and at the same time the stationary member has ample strength and stiffness.

For the purpose of reducing the size of this machine, so that it will occupy the minimum amount of space, I prefer to use the least amount of material in the laminated structure which will produce the required flux in the air gap for starting the machine on alternating current. I have found that the necessary torque for starting a machine on alternating current can be obtained by using a quantity of material which will carry a flux approximately ten per cent of that normally required for ordinary operation of the machine as an alternating current motor.

In addition to enabling a direct current dynamo-electric machine to start on alternating current, this construction also improves commutation during direct current operation of the machine, because the laminated structure, which forms a magnetic circuit for the commutating poles, permits faster shifting of flux with changes of load. In this manner, the commutating poles are made more effective to furnish the proper amount of flux to counteract the effect of the armature magnetomotive forces in the zone of commutation.

Modifications of the embodiment of my invention which I have described will occur to those skilled in the art, so that I desire my invention not to be limited to the particular arrangement set forth, and I intend in the claims to cover all modifications thereof which do not depart from the spirit and scope of my invention.

What I claim as new and desire to secure by Letters Patent of the United States, is:

1. A direct current dynamo-electric machine having a stationary member including a magnet frame, and means comprising laminated structure extending about the periphery of said magnet frame and secured thereto for carrying sufficient alternating current magnetic flux for starting said machine as a single phase alternating current motor.

2. A direct current dynamo-electric machine having a stationary member including a magnet frame provided with field poles extending radially inward therefrom, and means comprising laminated structure extending about the inner periphery of said magnet frame and extending between said magnet frame and said field poles for carrying sufficient alternating current magnetic flux for starting said machine as a single phase alternating current motor.

3. A direct current dynamo-electric machine having a stationary member including a magnet frame, and means including laminated structure comprising a plurality of arcuate shaped laminated bodies extending end to end about the inner periphery of said magnet frame and secured thereto for carrying sufficient alternating current magnetic flux for starting said machine as a single phase alternating current motor.

4. A direct current dynamo-electric machine having a stationary member including a magnet frame, a plurality of arcuate shaped laminated bodies extending end to end about the entire inner periphery of said magnet frame and secured thereto, the inner surfaces of said bodies having flat sides, and field poles secured to the flat sides of said laminated bodies.

In witness whereof, I have hereunto set my hand.

WYLIE HETER.